United States Patent [19]
Biddell

[11] 3,856,890
[45] Dec. 24, 1974

[54] FLAME RETARDANT COMPOSITIONS

[75] Inventor: William G. Biddell, San Mateo, Calif.

[73] Assignee: National Distillers and Chemical Corporation, New York, N.Y.

[22] Filed: May 23, 1973

[21] Appl. No.: 363,216

[52] U.S. Cl. ... 260/897 B, 260/45.75 B, 260/45.8 A
[51] Int. Cl. ............................................ C08f 45/58
[58] Field of Search ...... 260/45.75 B, 41 B, 45.8 A, 260/897 B

[56] References Cited
UNITED STATES PATENTS

| | | | |
|---|---|---|---|
| 2,676,927 | 4/1954 | McCurdy et al. | 260/45.7 |
| 2,744,881 | 5/1956 | Hendricks et al. | 260/45.75 |
| 3,093,599 | 6/1963 | Tamm et al. | 260/45.7 |
| 3,239,482 | 3/1966 | Rapp | 260/41 |
| 3,287,312 | 11/1966 | Ling | 260/41 |
| 3,354,191 | 11/1967 | Stivers | 260/45.75 |
| 3,422,055 | 1/1969 | Maloney | 260/897 |
| 3,632,544 | 1/1972 | Boyer | 260/45.75 |

*Primary Examiner*—V. P. Hoke
*Attorney, Agent, or Firm*—Allen A. Meyer, Jr.

[57] ABSTRACT

Flame retardant polymeric compositions prepared from a blend of low density polyethylene and ethylene-vinyl acetate copolymer and containing a halogen-containing fire retardant and an antimony compound; wherein the amount of antimony compound ranges from about 20 to 35% by weight, based on the total weight of the flame retardant composition and the weight ratio of the halogen-containing fire retardant to the antimony compound is less than about 1 to 1.

5 Claims, No Drawings

FLAME RETARDANT COMPOSITIONS

The present invention relates to novel flame retardant polymeric compositions that are especially useful for coating relatively small gauge electrical wire. More particularly, the invention pertains to polymerbased flame retardant compositions containing a blend of low density polyethylene and ethylene-vinyl acetate copolymer, a halogen-containing fire retardant as well as other additives including an antimony compound.

It has recently been proposed to prepare polymeric compositions for coating electrical wire wherein the polymer component comprises a blend of low density polyethylene and an ethylene-vinyl acetate copolymer. This use of such a blend provides desirable physical properties such as softness, solvent resistance and moisture resistance. When combined with a halogen-containing fire retardant such as Dechlorane 602 and antimony trioxide, coating compositions have been obtained that have excellent flame retardancy characteristics. However, when these compositions were employed to coat small gauge wire, e.g., 14 to 18 AWG, which do not provide a substantial heat sink, the very stringent flame retardance specifications were not fully satisfied.

In accordance with the present invention it has now been found that certain compositions can be formulated utilizing polymeric blends of low density polyethylene and ethylene-vinyl acetate copolymers that will meet these stringent flame retardancy specifications.

The stringent flame retardancy specifications referred to above are those set by the Underwriters' Laboratories, Incorporated vertical flame test Subject 758, as revised on Jan. 1, 1973, under the description FR-1.

The broad concept of the present invention involves the discovery that by increasing the amount of the antimony compound in the overall composition and by employing a weight ratio of the halogen-containing fire retardant to antimony compound of less than about 1 to 1, the desired flame retardancy can readily be achieved. This is in contrast to prior art teachings wherein the flame retardant compositions generally contain considerably more of the halogen-containing fire retardant than the antimony compound. The weight ratio taught by the prior art ranged from about 2/1 to 3/1.

The polymeric component is a combination of low density polyethylene and ethylene-vinyl acetate copolymer. In general, the amount of the polymeric component will range from about 50 to 75% by weight based on the total weight of the flame retardant polymeric composition. Although the relative amounts of the low density polyethylene and ethylene-vinyl acetate copolymer employed in the formulation may vary widely, i.e., at least 20% by weight of the ethylene-vinyl acetate copolymer, based on the total weight of the polymeric component; the low density polyethylene and ethylene-vinyl acetate copolymer may be utilized in approximately equal amounts.

Both the low density polyethylene and the ethylene-vinyl acetate copolymer must be present in the formulation in order for the resulting wire coating to have the desired physical and electrical characteristics.

The low density polyethylene will have a density within the range of 0.915 to 0.935 gram/cc. Low density polyethylene (0.92 gm/cc) may be produced, for example, by the polymerization of ethylene at a pressure greater than twelve hundred atmospheres and at a temperature of 100° to 300°C. Lower pressures of about five hundred atmospheres can be used if a catalyst such as oxygen or benzoyl peroxide is added to the ethylene as described by Fawcett et al., Chemical Abstracts, 32, 1362, (1938). Such a low density polyethylene is sold under the tradename DYNH by Union Carbide Corporation and has a melt index of 2.0 grams/10 minutes and a 0.92 gm/cc density.

The ethylene-vinyl acetate copolymer will have a density within the range of from about 0.92 to 0.95 gm/cc. An ethylene-vinyl acetate copolymer having a melt index of 2.5 and a density of 0.943 is sold under the tradenames Alathon 3170 and Gulf 7002. In general, these copolymers will contain from about 7 to 21% by weight, preferably from about 16 to 20%, of vinyl acetate.

The fire retardant additive utilized in forming the flame retardant polymeric compositions of this invention is

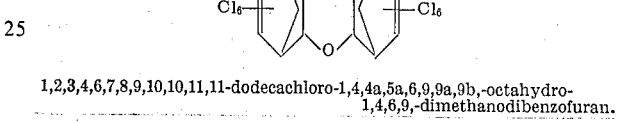

1,2,3,4,6,7,8,9,10,10,11,11-dodecachloro-1,4,4a,5a,6,9,9a,9b,-octahydro-1,4,6,9,-dimethanodibenzofuran.

This compound is currently sold under the trademark Dechlorane 602. For purposes of convenience, this compound will be referred to hereinafter either under its trademark or as dibenzofuran. The amount of Dechlorane 602 employed for the present purposes will range from about 10 to 30%, preferably 15 to 20% by weight, based on the total weight of the composition.

Antimony trioxide is the preferred antimony compound, although many other antimony compounds may be utilized. Suitable inorganic antimony compounds include antimony sulfide, sodium antimonite, potassium antimonate, and the like. Many organic antimony compounds are also suitable such as the antimony salts of organic acids and their pentavalent derivatives, disclosed in U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives. The amount of antimony compound employed will range from about 20 to 35%, and preferably from about 22 to 28% by weight, based on the total weight of the finished composition.

Another component that can be present in the polymer-based flame retardant composition is a polyfunctional monomeric cross-linking agent such as triallyl isocyanurate, triallyl cyanurate, trivinyl cyanurate, trivinyl citrate and the like. The amount of this cross-linking agent may vary from about 0.1 to 5.0%, preferably from about 0.4 to 2.0% by weight, based on the total weight of the flame retardant composition.

It has also been found useful to employ conventional cross-linking agents such as organic peroxides. Typical organic peroxide free radical generators include dicumyl peroxide; 2,5-bis (tert.-butylperoxy)-2,5 dimethylhexane; di-t-butyl peroxide; benzoyl peroxide, lauroyl peroxide, stearnyl peroxide; and the like, as discussed in U.S. Pat. No. 3,287,312.

The amount of organic peroxide when employed will range from about 1.0 to 5.0 by weight based on the total weight of the flame retardant composition.

Minor amounts of other additives may also be employed. Conventional antioxidants such as the polyquinolines and the like are often utilized in flame retardant polymeric compositions. Other ingredients that may be included are plasticizers, dyes, pigments, heat and light stabilizers, antistatic agents, and the like.

It has been found useful to employ a minor amount of an acid acceptor in the flame retardant compositions. Thus, for example, acid acceptors such as tetrabasic lead fumarate, magnesium oxide, calcium carbonate, litharge, and the like may be utilized. The amount of acid acceptor may range from about 0.5 to 2.0% by weight based on the total weight of the composition. One of the reasons for employing the acid acceptors is to avoid loss of peroxide during reaction.

The flame retardant polymeric compositions of this invention are particularly suitable as coatings for small gauge wire in nuclear power plants for radiation resistance, control cables, lead wires and the like. The wire coating will generally vary in thickness from about 15 to 60 mils. Obviously, the flame retardant compositions can also be effectively utilized for coating wire of all standard gauges.

The flame retardant compositions of this invention are prepared by utilizing conventional methods such as internal mixers such as Banbury, continuous mixers, mixing extruders, and two-roll mills. Conventional procedures and apparatus can also be employed in extruding the flame retardant compositions of this invention on to the electrical wires.

The invention will be more fully understood by reference to the following specific embodiments which are not to be construed as limiting the scope of the invention but only for the purposes of illustration. Unless otherwise indicated, all of the amounts of ingredients are expressed in parts by weight.

EXAMPLE

The following formulations were made in a OOC Banbury, chopped, and then extruded on to a 14 AWG wire using a heat temperature of 240°F to obtain a 0.030 inch wall thickness.

TABLE

|  | Formulations | | | |
| --- | --- | --- | --- | --- |
|  | 1 | 2 | 3 | 4 |
| Polymer | | | | |
| DYNH (LDPE) | 29.80 | 25.30 | 25.30 | 25.30 |
| Gulf 7002 (EVA) | 29.80 | 25.30 | 25.30 | 25.30 |
| Dechlorane 602 | 26.00 | 26.00 | 35.00 | 20.00 |
| Antimony Trioxide | 9.00 | 18.00 | 9.00 | 25.00 |
| Tetrabasic Lead Fumarate* | 1.00 | 1.00 | 1.00 | 1.00 |
| Agerite Resin D** | 1.00 | 1.00 | 1.00 | 1.00 |
| Dicumyl Peroxide | 3.00 | 3.00 | 3.00 | 3.00 |
| Triallyl Isocyanurate | 0.40 | 0.40 | 0.40 | 0.40 |
| Specific Gravity (g/cc) | 1.21 | 1.34 | 1.29 | 1.40 |
| Tensile Strength (psi) | — | — | 2275 | 2675 |
| Maximum Elongation (%) | — | — | 535 | 465 |
| UL Subject 758 | 5P/7 | 3P/4 | 6P/9 | 9P/9 |

*Lectro 78
** Polymerized trimethyl dihydroquinoline

The above data show that in the first three formulations, where the weight ratio of the Dechlorane 602 to antimony trioxide is greater than 1 to 1, and even with more antimony oxide than usual as in Formulation 2, the coated wire still did not pass the stringent flame retardancy test. However, in Formulation 4 where the amount of antimony trioxide is increased substantially and the aforementioned weight ratio is less than 1 to 1, superior flame retardancy was achieved as evidence by 9 specimens passing out of the 9 tested.

While particular embodiments of the invention have been set forth above, it will be understood that the invention is obviously subject to modifications and variations without departing from its broader aspects.

What is claimed is:

1. A cross-linkable, flame retardant polymeric composition comprising the following ingredients:

| | | Weight, % |
| --- | --- | --- |
| (a) | polymer blend of approximately equal amounts of low density polyethylene plus ethylene-vinyl acetate copolymer | 50 to 75 |
| (b) | antimony trioxide | 20 to 35 |
| (c) | 1,2,3,4,6,7,8,9,10,10,11,11-dodecachloro-1,4,4a,5a,6,9,9a,9b-octahydro-1,4,6,9-dimethanodibenzofuran; | 10 to 30. | and wherein the weight ratio of the dimethanodibenzofuran compound to the antimony oxide is less than about 1 to 1.

2. The cross-linkable, flame retardant polymeric composition of claim 1 containing from about 0.5 to 2.0% by weight of tetrabasic lead fumarate and from about 0.1 to 5% by weight of triallyl isocyanurate.

3. The cross-linkable, flame retardant polymeric composition of claim 1 containing from about 1.0 to 5% by weight of an organic peroxide cross-linking agent.

4. A cross-linkable, flame retardant polymeric composition comprising the following ingredients:

| | | Weight, % |
| --- | --- | --- |
| (a) | polymer blend of low density polyethylene plus ethylene-vinyl acetate copolymer | 50 to 75 |
| (b) | antimony compound | 20 to 35 |
| (c) | 1,2,3,4,6,7,8,9,10,10,11,11-dodecachloro-1,4,4a,5a,6,9,9a,9b-octahydro-1,4,6,9-dimethanodibenzofuran | 10 to 30. | and wherein the weight ratio of the dimethanodibenzofuran compound to the antimony compound is less than about 1 to 1, the amount of ethylene-vinyl acetate copolymer in the polymeric blend is at least 20% by weight, and the ethylene-vinyl acetate copolymer contains from about 7 to 21% by weight of vinyl acetate.

5. The cross-linkable, flame retardant polymeric composition of claim 4 wherein the antimony compound is antimony trioxide.

* * * * *